United States Patent
Caterini et al.

(10) Patent No.: US 9,031,815 B2
(45) Date of Patent: May 12, 2015

(54) METHOD FOR DETECTING A MISFIRE CONDITION IN AN INTERNAL COMBUSTION ENGINE

(75) Inventors: Canio Rocco Caterini, Cancellara (IT); Francesco Alunni, San Sisto (IT); Luigi De Luca, Bologna (IT); Stefano Sgatti, Imola (IT)

(73) Assignee: Magneti Marelli S.p.A., Corbetta (IT)

( * ) Notice: Subject to any disclaimer, the term of this patent is extended or adjusted under 35 U.S.C. 154(b) by 466 days.

(21) Appl. No.: 13/572,865

(22) Filed: Aug. 13, 2012

(65) Prior Publication Data
US 2013/0191074 A1    Jul. 25, 2013

(30) Foreign Application Priority Data

Aug. 12, 2011  (IT) .............................. TO2011A0770

(51) Int. Cl.
*G01M 15/11*       (2006.01)
*G06F 17/16*       (2006.01)
*G01M 15/04*       (2006.01)
*F02B 77/08*       (2006.01)

(52) U.S. Cl.
CPC .............. *G01M 15/11* (2013.01); *G06F 17/16* (2013.01); *F02B 77/087* (2013.01); *F02B 77/086* (2013.01); *F02B 77/085* (2013.01); *G01M 15/042* (2013.01)

(58) Field of Classification Search
CPC ..... G01M 15/11; G01M 15/046; G06F 17/16; F02B 77/085–77/086
USPC ....................................................... 702/182
See application file for complete search history.

(56) References Cited

U.S. PATENT DOCUMENTS

| 5,487,008 A | * | 1/1996 | Ribbens et al. ............... 701/102 |
| 5,824,890 A | * | 10/1998 | La Palm et al. ............ 73/114.04 |
| 6,278,934 B1 | * | 8/2001 | Yoon ............................. 701/111 |
| 6,357,287 B1 |   | 3/2002 | Jin |

(Continued)

FOREIGN PATENT DOCUMENTS

| EP | 0637738 A1 | 2/1995 |
| EP | 1447655 A2 | 8/2004 |
| WO | 9419670 A1 | 9/1994 |

OTHER PUBLICATIONS

Mar. 22, 2012 Search Report for Italian Patent App. No. IT TO20110770.

*Primary Examiner* — John Breene
*Assistant Examiner* — Lynda Dinh
(74) *Attorney, Agent, or Firm* — Howard & Howard Attorneys PLLC

(57) ABSTRACT

A method detects a "misfire" condition in an internal-combustion engine including a control unit, a driving shaft and phonic wheel that is splined to the shaft and coupled to a sensor. The method comprises steps of: detecting intensity of a signal generated by passage of teeth of the wheel by the sensor, sampling the signal generated by the passage of the teeth, processing the sampled signal by applying a discrete Fourier transform, representing the sampled signal processed by a virtual phasor that represents in a vector form the signal that has been sampled and processed, determining a corresponding theoretical phasor for the virtual phasor that represents theoretical evolution of the signal that has been sampled and processed over time, comparing the theoretical phasor with the virtual phasor, and determining presence of a "misfire" condition by comparing the theoretical phasor with the virtual phasor that represents the signal that has been sampled and processed.

13 Claims, 2 Drawing Sheets

(56) References Cited

Figure 1:
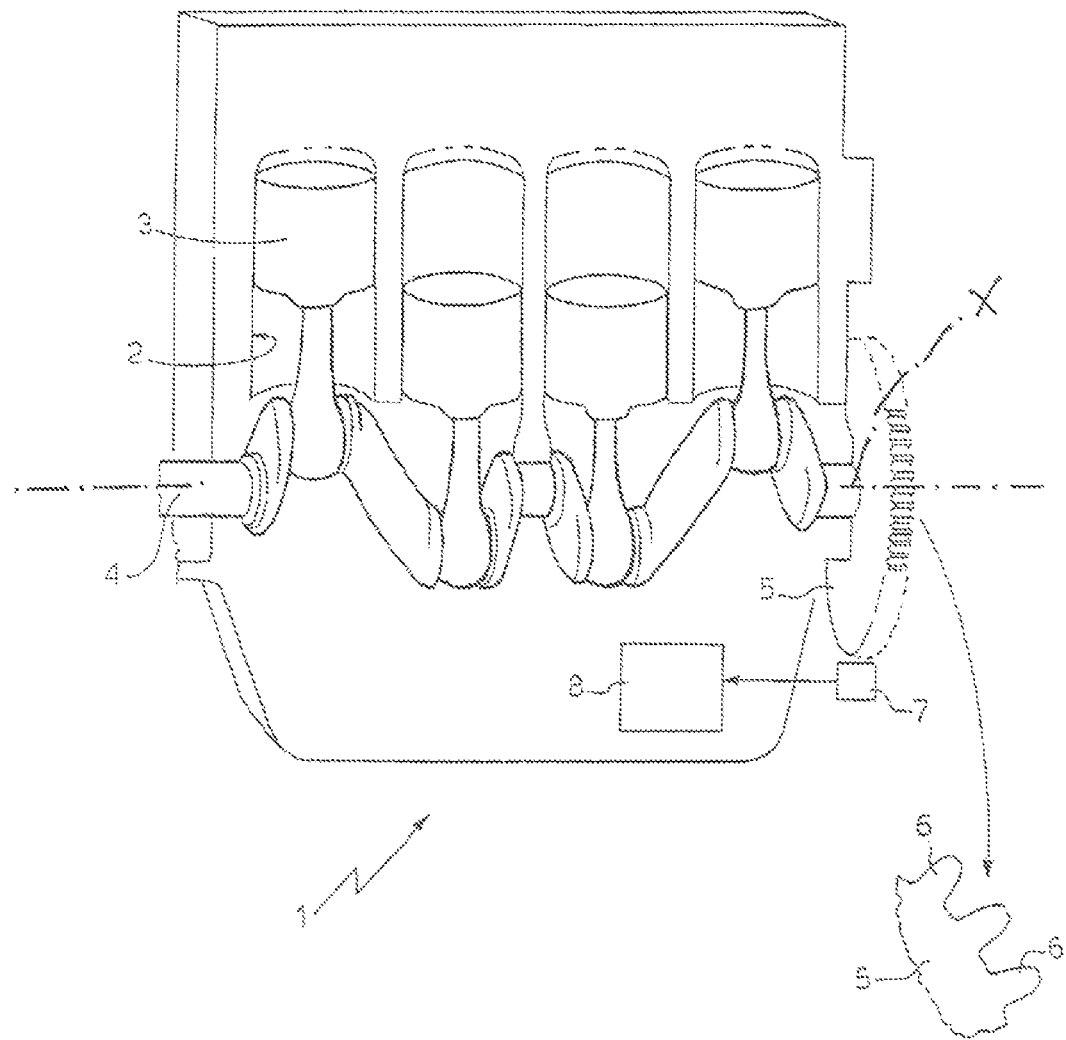

U.S. PATENT DOCUMENTS 6,978,666 B1 * 12/2005 Wu et al. .................. 73/114.04
2003/0163242 A1 * 8/2003 Miyauchi et al. ............. 701/111
2008/0190184 A1   8/2008 Walters

* cited by examiner

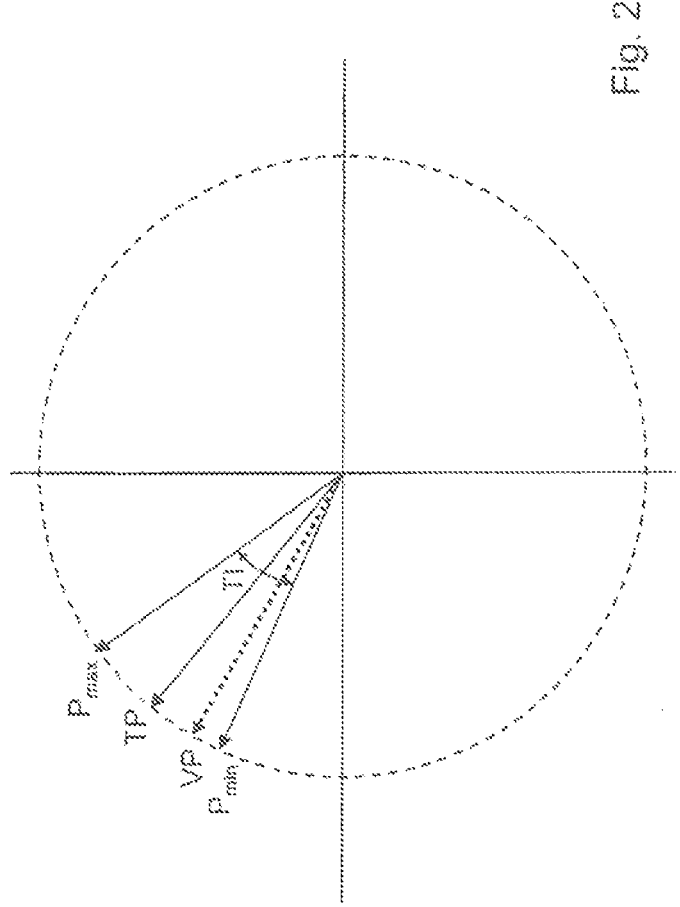

METHOD FOR DETECTING A MISFIRE CONDITION IN AN INTERNAL COMBUSTION ENGINE

REFERENCE TO RELATED APPLICATION

This application claims benefit of the filing date of and priority to Italian Patent Application TO2011A 000770 filed on Aug. 12, 2011.

BACKGROUND OF INVENTION

1. Field of Invention

The invention relates to a method for detecting a "misfire" condition in an internal combustion engine.

2. Description of Related Art

In a spark-controlled internal-combustion engine, misfire indicates a condition of poor combustion occurring in one or more cylinders. In particular, the "misfire" condition is referred to as "spark misfire" when it is caused by insufficient or no spark energy generated by the spark plug or "injection misfire" when the condition is caused by insufficient or no fuel feed.

The presence of "misfire" conditions is particularly dangerous because poor combustion causes engine-performance degradation, increase of the level of polluting engine emissions, and possible permanent damage to the catalyst. For this reason, European "emission limit" standards for motor vehicles require to implement effective misfire detection and indicate the presence of "misfire" conditions to the driver by a blinking warning light on the instrument panel. More specifically, European "emission limit" standards require to indicate an increase of the level of polluting emissions when the number of misfires in a first interval [e.g., 1000 "TDC" (top dead centers)] exceeds a first threshold and a permanent degradation of the catalyst when the number of misfires in a second interval (e.g., 1000 "TDC") exceeds a second threshold.

"Misfire" conditions are currently detected in an indirect manner (i.e., by analyzing either the instantaneous "angular acceleration" value of the driving shaft or instantaneous "driving torque" value because a direct analysis of the combustion by sensors arranged within each cylinder is not feasible due to cost reasons.

The most common method for detecting "misfire" conditions consists in analyzing the angular acceleration of the driving shaft. In particular, by using the signal supplied by the phonic wheel, the value of the angular acceleration of the driving shaft is calculated at given angular positions of the driving shaft itself and "misfire" conditions are detected if the absolute value of the angular acceleration of the driving shaft is higher than a given threshold value.

However, it has been noted that such a method is not very reliable because the absolute value of the angular acceleration of the driving shaft may exceed the threshold value even for causes not connected to "misfire" conditions—such as switching "on" and "off" the air-conditioning-system compressor, road roughness, or sudden decelerations. Furthermore, in case of a single misfire, torsion oscillations may be trigged on the "angular acceleration" value of the driving shaft, which cause the absolute value of the angular acceleration of the driving shaft to exceed the threshold value in several later instants. In this case, a single "misfire" condition is incorrectly detected as a plurality of several successive misfires.

A first solution to the above-described problem is provided by European Patent Application EP-0637738-A1, which describes a method for detecting "misfire" conditions in an internal-combustion engine by analyzing the angular acceleration of the driving shaft. To attempt to eliminate the influence of interferences, the "angular acceleration" value of the driving shaft is processed by creating an index referred to as "cyclicity," which, compared with appropriate thresholds, indicates the presence of "misfire" conditions. However, the method tends to incorrectly detect a plurality of successive misfires instead of a single misfire due to the oscillations of the angular acceleration of the driving shafts trigged by a single misfire.

European Patent Application EP-A1-1447655 describes a method for detecting "misfire" conditions in an internal-combustion engine by analyzing the angular acceleration of the driving shaft, which includes estimating the "angular acceleration" value of the driving shaft at given angular positions of the driving shaft itself, comparing the absolute value of the angular acceleration of the driving shaft, and detecting the presence of "misfire" conditions if the absolute value of the angular acceleration of the driving shaft is higher than the given threshold value. A series of "angular acceleration" values of the driving shaft, which follow the "angular acceleration" value of the driving shaft at which the "misfire" condition was detected, are filtered to eliminate the oscillation component induced by the "misfire" condition on the "angular acceleration" value of the driving shaft whenever a "misfire" condition is detected (i.e., the absolute value of the angular acceleration of the driving shaft exceeds the threshold value). At this point, only the filtered values of the angular acceleration of the driving shaft are compared with the threshold value to detect the possible presence of further "misfire" conditions that follow the detected one. However, the method proved not to ensure good performance at high engine speeds (in particular, when rpm is higher than 4500).

Thus, it is the object of the invention to provide a method for detecting a "misfire" condition in an internal-combustion engine. More specifically, it is the object of the invention to provide such a method that is free from the above-described drawbacks and, in particular, easy and cost-effective to be implemented and capable of minimizing the percentage of false detections and missed detections of "misfire" conditions.

SUMMARY OF INVENTION

The invention overcomes the drawbacks in the related art in a method for detecting a "misfire" condition in an internal-combustion engine that includes a control unit, a driving shaft and phonic wheel that is splined to the driving shaft and coupled to a sensor. The method comprises steps of: detecting intensity of a signal generated by passage of teeth of the phonic wheel by the sensor, sampling the signal generated by the passage of the teeth, processing the sampled signal by applying a discrete Fourier transform, representing the sampled signal processed by a virtual phasor that represents in a vector form the signal that has been sampled and processed, determining a corresponding theoretical phasor for the virtual phasor that represents theoretical evolution of the signal that has been sampled and processed over time, comparing the theoretical phasor with the virtual phasor, determining presence of a "misfire" condition by comparing the theoretical phasor with the virtual phasor that represents the signal that has been sampled and processed and detecting the presence of the misfire condition according to an increase in amplitude of the signal that has been sampled and processed.

The method of the invention detects a "misfire" condition in an internal-combustion engine. More specifically, the method is free from the above-described drawbacks and, in particular, easy and cost-effective to be implemented, and capable of minimizing the percentage of false detections and missed detections of "misfire" conditions.

Other objects, features, and advantages of the method for detecting a "misfire" condition in an internal-combustion engine of the invention are readily appreciated as the method becomes more understood while the subsequent detailed description of at least one embodiment of the method is read taken in conjunction with the accompanying drawing thereof.

BRIEF DESCRIPTION OF EACH FIGURE OF DRAWING

FIG. 1 is a diagrammatical partial side elevational and sectional view of an internal-combustion engine provided with a control unit that implements an embodiment of a method for detecting a "misfire" condition of the invention; and FIG. 2 is a graphical representation by phasors used by the control unit of FIG. 1 to validate the detection of "misfire" conditions.

DETAILED DESCRIPTION OF EMBODIMENT(S) OF INVENTION

FIG. 1 partially shows a petrol-fuelled internal-combustion engine generally indicated at 1. The internal-combustion engine 1 comprises four cylinders 2 each of which slidingly accommodates a respective piston 3 that is mechanically connected to a driving shaft 4 by a crack coupling. The driving shaft 4 is slidingly fitted about a longitudinal rotation axis "X" and, from pistons 3, receives the force generated by the combustion in the cylinders 2. Each piston 3 is, indeed, mechanically connected to the driving shaft 4 to transmit the force generated by the combustion of the petrol in the cylinder 2 to the driving shaft 4.

A phonic wheel 5 provided with sixty teeth 6 and coupled to a sensor 7, which is adapted to detect the time-elapsing between the passage of two consecutive teeth 6, is splined to the driving shaft 4. The engine 1 further comprises a control unit 8 that is connected to the sensor 7 and adapted to detect "misfire" conditions that occur within the cylinders 2.

The method used by the control unit 8 to detect "misfire" conditions using the information supplied by the sensor 7 coupled to the phonic wheel 5 is described below. A circular buffer "B", the size of which is variable as a function of the rotation speed of the driving shaft 4, is stored in the control unit 8. It has been experientially determined that the method allows to reach good performance by differentiating the size of the circular buffer "B" for low, medium, and high rpm.

According to an embodiment, low rpm are identified at engine speeds slower than 2500 rpm, medium rpm are in the range from 2500 to 4500, and high rpm are higher than 4500. At each top dead centre ""TDC"," buffer "B" is refreshed according to a "FIFO" (First In/First Out) logic, whereby, as in a queue, a new set of samples "S" is added to the buffer "B" while the memory cells of the older set of samples "S" are released from buffer "B."

According to an embodiment, the number of samples "S" is variable. In particular, the number of samples "S" is variable as a function of the time used by the driving shaft 4 to cover the angular measuring section the amplitude of which is measured using the signal from the phonic wheel 5. Indicatively, each angular measuring section has an angular amplitude equal to a number of teeth 6 of the phonic wheel 5 from three to twelve. According to an embodiment, each angular measuring section has an angular amplitude equal to three, six, or ten teeth 6 of the phonic wheel 5.

The combustion period (i.e., time elapsing between two subsequent combustions) is equal to 180° (the distance between top dead centre "TDC" and bottom dead centre "BTC"). Since the phonic wheel 5 has sixty teeth, it is apparent that the combustion period is equal to thirty consecutive tooth times. The following relation, thus, applies:

$$S = 30/N_{teeth\_sample}$$

where:
S=number of samples;
30=consecutive tooth times of each combustion period; and
$N_{teeth\_sample}$=consecutive tooth times for each sample.

Furthermore, the number of samples "S" is variable as a function of the number of analyzed combustions. The following relation, thus, applies:

$$S = B/N_{comb\_sample}$$

where:
S=number of samples;
B=size of the circular memory buffer; and
$N_{comb\_sample}$=number of combustions analyzed for each sample.

For low rpm (i.e., lower than 2500 rpm), the memory buffer "B" has a size of twenty memory cells and is adapted to contain ten samples "S" (each of which is equal to an angular measuring section of angular amplitude equal to three teeth 6 of the phonic wheel 5), and two combustions are analyzed.

For medium rpm (i.e., from 2500 to 4500 rpm), the memory buffer "B" also has a size of twenty memory cells and is adapted to contain five samples "S" (each of which is equal to an angular measuring section of angular amplitude equal to six teeth 6 of the phonic wheel 5), and four combustions are analyzed.

For high rpm (i.e., higher than 4500 rpm), the memory buffer "B" has a size of twenty-four memory cells and is adapted to contain three samples "S" (each of which is equal to an angular measurement section of angular amplitude equal to ten teeth 6 of the phonic wheel 5), and eight combustions are analyzed.

The intensity of the signal "S" generated by the passage of the teeth 6 of the phonic wheel 5 is, thus, sampled by the buffers in the above-described manner. A discreet function is, thus, obtained on which a discrete Fourier transform ""DFT"" (particular type of "Fourier" transform) is applied.

At a misfire, it occurs that the sampled signal "S" generated by the passage of the teeth 6 of the phonic wheel 5 and on which a discrete Fourier transform ""DFT"" is applied displays an increase of the amplitude of the signal itself. In other words, after a misfire, the amplitude of the sampled signal "S" generated by the passage of the teeth 6 of the phonic wheel 5 and on which a discrete Fourier transform ""DFT"" was applied is larger than in the previous conditions without misfire.

The signal "S" generated by the passage of the teeth 6 of the phonic wheel 5, thus, allows to detect the "misfire" events by identifying an increase of the amplitude of the signal "S" itself. Once the "misfire" condition has been identified, the correct detection is validated by a graphic representation made by using phasors. As known, a phasor is a complex number that may be represented on the "Gauss" plane as a rotating vector and is equivalent to a sinusoidal function. It is, thus, convenient to represent the phasor in a vector manner as shown in FIG. 2.

In essence, a virtual phasor ""VP"" associated with the sinusoidal signal "S" obtained by applying the discrete Fourier transform "DFT" is generated. The virtual phasor "VP" is the complex number having the effective value of the signal "S" obtained by applying the discrete Fourier transform as a module and the phase of the signal "S" obtained by applying the discrete Fourier transform as a topic.

In other words, the vector representation of the virtual phasor "VP" that is obtained on the complex plane consists of a vector that departs from the origin and, with the real axis (or abscissa axis "X"), forms an angle "α" equal to the phase of the sinusoidal signal obtained by applying the discrete Fourier transform "DFT." Moreover, the vector has an amplitude "Y" equal to the effective value of the sinusoidal signal obtained by applying the discrete Fourier transform. "DFT."

The method used by the control unit 8 to validate the detection of a "misfire" condition using the graphic representation by phasors is described below. The method consists in determining a theoretical phasor for each virtual phasor "VP," which represents the evolution over time that the virtual phasor "VP" should have (which graphically represents the signal from the phonic wheel 5).

In other words, the virtual phasor "VP" represents the signal "S" that has been sampled and processed by the discrete Fourier transform "DFT" in a vector form, and the theoretical phasor "TP" represents the theoretical (i.e., not real, but ideal) evolution of the signal "S" that has been sampled and processed by the discrete Fourier transform "DFT" over time.

The virtual phasor "VP" is compared with the theoretical phasor "TP" in a predetermined number of points. In particular, the theoretical phasor "TP" covers rotation steps of predetermined, fixed amplitude equal to:

$$\alpha step = 360/N_{TDC}$$

where:
$\alpha_{step}$=amplitude of each single rotation step; and
$N_{TDC}$=number of analyzed top dead centers "TDC" (i.e., combustions).

The comparison of the theoretical phasor "TP" with the virtual phasor "VP" occurs at each single rotation step. If the result of the comparison of the theoretical phasor "TP" with the virtual phase "VP" that graphically represents the signal from the phonic wheel 5 is positive, then the detection of the "misfire" condition is validated.

According to an embodiment, the detection of the "misfire" condition is validated if the virtual phasor "VP" coincides with the theoretical phasor "TP." According to another embodiment, a given tolerance interval "TI" is determined, instead, in a preliminary step of setting up and adjusting. The detection of the "misfire" condition is validated if the virtual phasor "VP" substantially coincides with the theoretical phasor "TP" (i.e., is within a "confidence" interval that is centered on the theoretical phasor "TP" and has an amplitude equal to the tolerance interval "TI" delimited by the two end phasors "$P_{min}$" and "$P_{max}$").

Furthermore, according to an embodiment, the detection of the "misfire" condition is only validated if the virtual phasor "VP" substantially coincides with the theoretical phasor "TP" for a time interval with a predetermined duration. According to an embodiment, this time interval with a predetermined duration is equal to a "rotation step" number. In other words, the detection of the "misfire" condition is validated only if the result of the comparison of the theoretical phasor "TP" with the virtual phasor is positive for a number of rotation steps in sequence. According to another embodiment, this time interval with a predetermined duration is equal to a threshold value "S" determined during a preliminary step of setting up and adjusting. In this case, the presence of the "misfire" condition is detected if the virtual phasor "VP" substantially coincides with the theoretical phasor "TP" for a time interval with a duration that is at least equal to the given threshold value "S."

The detection of a number of "misfire" conditions may easily occur. In this case, the method includes graphically representing the signal from the phonic wheel 5 by a virtual phasor "VP" for each detected "misfire" condition and determining, for each "misfire" condition, a corresponding theoretical phasor "TP" that represents the evolution over time that the respective virtual phasor "VP" should have. Also in this case, each theoretical phasor "TP" covers the rotation steps of predetermined, fixed amplitude. For each rotation step, it is possible to carry out a vector addition of the virtual phasors "VP" and, similarly, a vector addition of the theoretical phasors "TP" associated with the virtual phasors "VP."

At this point, the vector addition of the theoretical phasors "TP" is compared with the addition of the virtual phasors "VP." The presence of the "misfire" conditions is validated only if the result of the comparison of the vector addition of the theoretical phasors "TP" with the addition of the virtual phasors "VP" is positive [i.e., only if the vector addition of the virtual phasors "VP" substantially coincides (excluding the tolerance interval "TI") with the vector addition of the theoretical phasors "TP"].

Moreover, also in this case, according to an embodiment, the detection of the "misfire" condition is validated only if the vector addition of the virtual phasors "VP" substantially coincides with the vector addition of the theoretical phasor "TP" for a time interval with a predetermined duration. According to an embodiment, this time interval of predetermined duration is equal to a number of rotation steps. According to another embodiment, this time interval of predetermined duration is equal to a threshold value "S" determined during a preliminary step of setting up and adjusting. In this case, the presence of "misfire" conditions is detected if the vector addition of the virtual phasors "VP" substantially coincides with the vector addition of the theoretical phasors "TP" for a time interval with a duration that is at least equal to the given threshold value "S."

According to an embodiment, a maximum number of detectable "misfire" conditions is determined during a preliminary step of setting up and adjusting. In another embodiment, the maximum number of detectable "misfire" conditions is three.

If the comparison of the vector addition of the theoretical phasors "TP" with the addition of the virtual phasors "VP" is negative (i.e., only if the vector addition of the virtual phasors "VP" does not substantially coincide with the vector addition of the theoretical phasors "TP"), the control unit 8 is set up to implement a "check" method to validate the detection of some "misfire" conditions only. By way of example, the "check" method includes ignoring the last "misfire" condition that was detected and repeating the comparison of the vector addition of the theoretical phasors "TP" with the addition of the virtual phasors "VP" without taking into account the virtual phasor "VP" associated with the last "misfire" condition and corresponding theoretical phasor "TP".

Experimental tests pointed out that the detection method of the invention ensures good performance (in terms of reliability and accuracy of the detection of "misfire" conditions) at all engine speeds without excessively compromising the memory occupation of the control unit 8.

It should be appreciated by those having ordinary skill in the related art that the detection method of the invention has been described above in an illustrative manner. It should be so appreciated also that the terminology that has been used above is intended to be in the nature of words of description rather than of limitation. It should be so appreciated also that many modifications and variations of the detection method are possible in light of the above teachings. It should be so appreciated also that, within the scope of the appended claims, the detection method may be practiced other than as specifically described above.

What is claimed is:

1. A method for detecting a misfire condition in an internal-combustion engine that includes a control unit, a driving shaft and phonic wheel that is splined to the driving shaft and coupled to a sensor, the method comprising steps of:
    detecting intensity of a signal generated by passage of teeth of the phonic wheel by the sensor;
    sampling the signal generated by the passage of the teeth;
    processing the sampled signal by applying a discrete Fourier transform;
    representing the sampled signal processed by a virtual phasor that represents in a vector form the signal that has been sampled and processed;
    determining a corresponding theoretical phasor for the virtual phasor that represents theoretical evolution of the signal that has been sampled and processed over time;
    comparing the theoretical phasor with the virtual phasor; and
    determining presence of a misfire condition by comparing the theoretical phasor with the virtual phasor that represents the signal that has been sampled and processed; and
    detecting the presence of the misfire condition according to an increase in amplitude of the signal that has been sampled and processed.

2. A detection method as set forth in claim 1, wherein the theoretical phasor performs at least one rotation step with a predetermined, fixed amplitude equal to $$\alpha_{step}=360/N_{TDC},$$

where $\alpha_{step}$=amplitude of the rotation step and $N_{TDC}$=number of top dead centers that have been analyzed.

3. A detection method as set forth in claim 1, wherein the method comprises further steps of:
    determining a given threshold value in a preliminary step of setting up and adjusting; and
    determining the presence of the misfire condition if the virtual phasor substantially coincides with the theoretical phasor for a time interval that is at least equal to the given threshold value.

4. A detection method as set forth in claim 3, wherein the method comprises further steps of:
    determining a given tolerance interval in the preliminary step of setting up and adjusting; and
    determining the presence of the misfire condition if the virtual phasor is within a confidence interval that is centered on the theoretical phasor and has an amplitude substantially equal to the given tolerance interval.

5. A detection method as set forth in claim 3, wherein, if the presence of the misfire condition is determined, the method comprises further steps of:
    graphically representing the signal that has been sampled and processed by the virtual phasor for the determined misfire condition;
    determining the theoretical phasor for the misfire condition that represents the evolution that the corresponding virtual phasor is supposed to have over time;
    performing a vector addition of the virtual phasors;
    performing a vector addition of the theoretical phasors associated with the virtual phasors;
    comparing the vector addition of the theoretical phasors with the vector addition of the virtual phasors; and
    validating the presence of the misfire conditions by comparing the vector addition of the theoretical phasors with the vector addition of the virtual phasors.

6. A detection method as set forth in claim 5, wherein the method comprises a further step of determining a maximum number of the detectable misfire conditions in the preliminary step of setting up and adjusting.

7. A detection method as set forth in claim 1, wherein the step of sampling the signal generated by the passage of the teeth is carried out by a substantially circular memory buffer.

8. A detection method as set forth in claim 7, wherein a size of the substantially circular memory buffer varies as a function of rotation speed of the driving shaft.

9. A detection method as set forth in claim 8, wherein the size of the substantially circular memory buffer is differentiated for engine speeds lower than 2500 rpm, between 2500 rpm and 4500 rpm, and higher than 4500 rpm.

10. A detection method as set forth in claim 7, wherein a number of samples used to sample the signal generated by the passage of the teeth is variable.

11. A detection method as set forth in claim 10, wherein the number of samples varies as a function of time required by the driving shaft to cover an angular measuring section defining a size of the angular measuring section that is equal to a number of the teeth ranging from 3 to 12.

12. A detection method as set forth in claim 11, wherein the number of the teeth equals any of 3, 6 and 10.

13. A detection method as set forth in claim 7, wherein a number of samples varies as a function of a number of analyzed combustions.

* * * * *